Aug. 15, 1961 A. E. CASPER 2,995,868
APPARATUS FOR POLLINATING MONOCLINOUS PLANTS
Filed Nov. 13, 1959
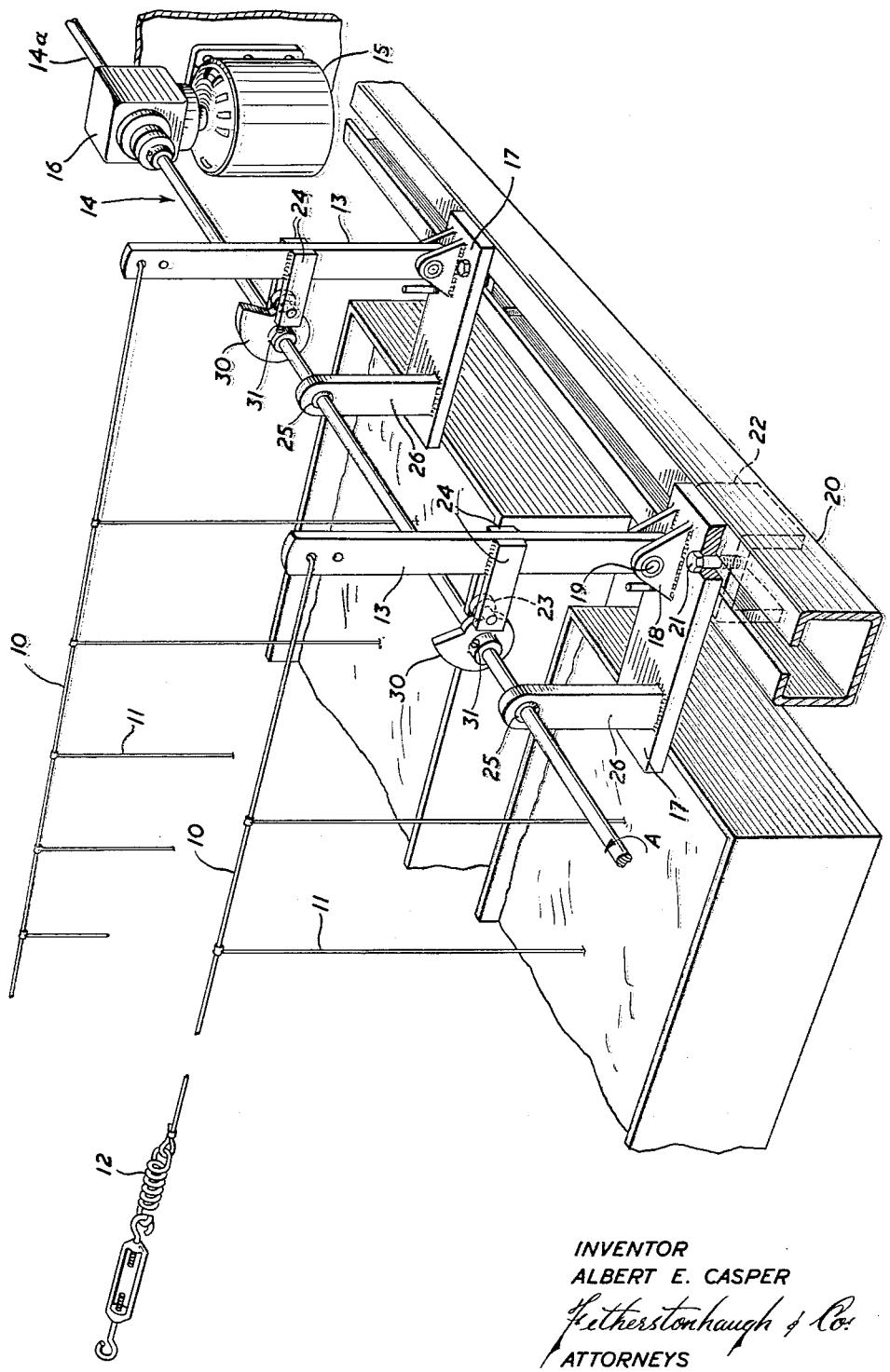
INVENTOR
ALBERT E. CASPER
Featherstonhaugh & Co.
ATTORNEYS

United States Patent Office 2,995,868
Patented Aug. 15, 1961

2,995,868
APPARATUS FOR POLLINATING MONO-
CLINOUS PLANTS
Albert E. Casper, P.O. Box 88, Ruthven,
Ontario, Canada
Filed Nov. 13, 1959, Ser. No. 852,791
6 Claims. (Cl. 47—1)

This invention relates to the pollination of plants and is particularly concerned with an apparatus for pollinating monoclinous plants by shaking.

Monoclinous plants are characterized by the arrangement of the pistil and stamens within a single flower envelope. The plants are self-pollinating and require movement of the flower envelope in order to shake the pollen from the male stamens onto the female pistils. Under normal growing conditions this movement is effected by the wind or animals moving against the plants. The tomato plant is a monoclinous plant and when grown in greenhouses needs assistance in pollinating since the normal motivating forces for effecting the pollination are not present. Accordingly, it has been the practice to effect pollination of greenhouse tomatoes and similar plants by shaking the plant or flower envelope artificially either by hand or by means of a hand-held buzzer designed for this purpose. These methods are effective but require a great deal of time and since most commercial growing operations of tomato plants involve thousands of individual plants the total number of man-hours to effect pollination can be a major item in the cost picture of hothouse and greenhouse operations. Furthermore, some growers have observed that certain hours of the day are more suitable for effective pollination than other times. For example, it has been observed that shaking tomato plants during mid-morning and late afternoon will more often result in pollination than shaking carried out during other periods of the day. Unfortunately, in large growing operations many men would be required if the shaking operation were to be carried out only during the preferred periods. Accordingly, most growers employ one or two men, depending on the size of their operation, and have them working full time with the result that most of the shaking is conducted during periods of the day not conductive to effective pollination.

It is a feature of the present invention to provide an apparatus for automatically performing the shaking operation. The apparatus can be operated at only those periods of the day which are most favourable to pollination with the advantage that the pollination will be successfully completed and at a considerable saving in cost. Some growers may prefer to operate the apparatus throughout the day, in which case the cost saving would still be considerable since the cost of the power required to operate even a large number of the present devices would be cheap in relation to the wages involved should the same amount of shaking be carrietd out by hand. The present apparatus is of simple construction and could be easily adapted to present greenhouse plant arrangements so that the purchase and installation costs of the apparatus could be quickly regained by the saving in wages effected by their installation.

In accordance with the present invention an apparatus for pollinating monoclinous plants by shaking comprises suspension means carrying a plurality of spaced, substantially upright plant-supporting stringers, said suspension means including energy absorption means and being fixed at one end to means for vibrating said suspension means whereby said stringers and plants are also vibrated to effect pollination of the plants.

In the drawings, FIGURE 1 is a perspective view of one embodiment of the apparatus in accordance with this invention and illustrates the manner in which the apparatus is arranged with respect to greenhouse soil beds.

Referring to FIGURE 1 the apparatus essentially consists of a plurality of horizontal suspension wires 10 to which are attached vertical stringers 11 up which the plants grow, coil springs 12 at one end of each of the wires 10, the other ends of wires 10 being fixed to uprights 13 which are caused to move by means of the cam shaft 14 driven by motor 15 through a reduction gear box 16. Preferably the movement of uprights 13 is a quick jerking action whereby wires 10 are snapped rather forcibly. This type of action is obtained by tensioning wires 10 against the bias of springs 12 by slowly pivoting uprights 13 away from the plants and then suddenly releasing the uprights whereby the tension on the springs is released and the wires 10 are snapped.

Horizontal suspension wires 10 are preferably steel and of a size sufficient to support the weight of the plants suspended therefrom as is the common practice in present greenhouse operations. It has been found that the installation of the present apparatus in a greenhouse does not require replacing the old wire provided the latter has been properly chosen for the job. Accordingly, the installation of the present apparatus only involves fixing one end of the old wires to uprights 13 of the apparatus and fixing coil springs 12 to the other ends of the wires. Stringers 11 can be cord or twine as now is commonly used, preferably fixed rigidly to suspension wires 10 so as not to shift along wires 10 as the latter are snapped.

Uprights 13 are preferably of steel and are pivotally fixed at their bottoms to plates 17 by means of upstanding ears 18 and pins 19. Plates 17 are adapted to slide along the top of track 20 and are fixed in any desired position by means of bolts 21 extending therethrough and threadingly engaged in brackets 22 within track 20. The purpose in providing means whereby uprights 13 may be shifted laterally is that the rows of plants with which they correspond are not always equally spaced.

About the mid-point of each upright 13 is carried a cam follower 23, preferably a roller rotatably mounted between members 24. Cam shaft 14 is rotatably mounted in bearings 25 in standards 26 carried by plate 17. Cam shaft 14 carries a plurality of cams 30, one cam for each upright 13. Cams 30 are not permanently fixed to cam shaft 14 but may be loosened therefrom and rotated or shifted longitudinally of shaft 14 as desired. In the embodiment illustrated cams 30 are loosened from cam shaft 14 by means of set screws 31. Cam shaft 14 is rotated by motor 15 preferably operating through reduction gear box 15 or a similar device since it is desirable to rotate cam shaft 14 rather slowly so as to permit each suspension wire 10 to come to a stand-still between each snapping action. Motor 15 illustrated is electric but it will be appreciated that other types of prime movers, e.g., gasoline motors, would be suitable for the purpose.

Cam shaft 14 is rotated in the direction of arrow A, as shown, and cams 30 are so shaped to suddenly release the pressure normally retaining uprights 13 slanted away from the plants so that uprights 13, under the influence of spring 12 and the weight of the plants on suspension wire 10 pivot about pins 19 in a quick motion whereby to effectively snap wires 10. Cams 30 then bring uprights 13 slowly back to a slanted position during which time wires 10 slowly come to rest, springs 12 serving to elongate the vibration period. It will be obvious, that during the time interval wherein wires 10 are snapped and slowly allowed to come to rest that the plants are vigorously vibrated to effect the pollination thereof.

While in the foregoing description, one embodiment of the invention has been put forth by way of example and in considerable detail, it will be understood that the details of the apparatus may be modified widely by those skilled in the art without departing from the spirit of my invention. For example, by extending shaft 14 as at 14a and duplicating the rest of the apparatus on the other side of the motor and reduction gear assembly 15, 16, the apparatus may be adapted to serve more plants. Similarly, the apparatus could be placed in the centre of a long greenhouse and provided with two sets of cams on shaft 14 whereby to serve plants on both sides.

What I claim as my invention is:

1. An apparatus for pollinating monoclinous plants by shaking comprising a plurality of substantially horizontal suspension wires, a plurality of substantially vertical stringers extending from soil beds in which the plants are planted to attachment at regularly spaced intervals on each of said suspension wires, said vertical stringers supporting the plants requiring pollination; each of said suspension wires carrying turnbuckle means and coil spring means therein and being supported at one end by an upright capable of limited movement in a vertical plane defined by said suspension wire by virtue of being pivotally fixed at its bottom end to a horizontally shiftable plate member; a substantially horizontal rotatably mounted cam shaft carrying a plurality of cams, one for each of said uprights, and motor means for rotating said cam shaft, causing movement of said uprights through followers rotatably fixed to said uprights and in close contact with said cams, said movement having two phases, the first phase being a slow movement in one direction and the second phase being a quick movement in the opposite direction, each of said cams having a different circumferential position on said cam shaft with respect to each other cam whereby only one of said uprights is caused to move through said second phase at any one instant.

2. An apparatus for pollinating monoclinous plants by shaking comprising suspension means carrying a plurality of spaced, substantially upright, plant-supporting stringers, said suspension means including a plurality of substantially horizontal wires, each wire including energy absorption means and being attached at one end to a fixed member and at the other end to a movable member, and means for successively causing each wire to vibrate including means for moving each of said movable members in turn as to stretch said wires against the bias of said energy absorption means and to then suddenly release the tension in said wires created by said stretching whereby said wires and the plants supported thereby are vibrated and pollination of said plants effected.

3. An apparatus as claimed in claim 2 in which said movable members comprise uprights, pivotally mounted at their bottoms as to be capable of movement about their pivot points within vertical planes and in which said means for moving said uprights cause said uprights to move through small arcs in said planes at regularly timed intervals and in turn.

4. An apparatus as claimed in claim 3 in which said means to cause the movement of said uprights includes a cam follower attached to each of said members and a cam shaft carrying a plurality of cams shaped to move said uprights slowly in one direction to stretch said wires and suddenly, in the opposite direction, to release the tension in said wires, each cam having a different angular orientation with respect to said cam shaft, and a motor and speed reducer means rotating said cam shaft.

5. An apparatus as claimed in claim 4 in which said energy absorption means comprise coil springs and including a turnbuckle in each of said wires whereby the tension thereof may be manually adjusted.

6. An apparatus as claimed in claim 3 in which said uprights are pivotally attached to plate members slidably carried by a substantially horizontally disposed track whereby said uprights and said wires may be spaced from one another as desired, and means for locking said plates to said track to maintain the selected spacing.

References Cited in the file of this patent

UNITED STATES PATENTS 1,923,217     Lafferty _____ Aug. 22, 1933